US009143765B2

(12) United States Patent
Kim et al.

(10) Patent No.: US 9,143,765 B2
(45) Date of Patent: Sep. 22, 2015

(54) THREE DIMENSIONAL IMAGE DISPLAY

(75) Inventors: Hwi Kim, Seoul (KR); Kyung-Ho Jung, Yongin-si (KR); Seung-Hoon Lee, Hwaseong-si (KR); Hae-Young Yun, Suwon-si (KR); Seung-Jun Jeong, Asan-si (KR); Hee-Seop Kim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 810 days.

(21) Appl. No.: 13/136,841

(22) Filed: Aug. 12, 2011

(65) Prior Publication Data

US 2012/0075434 A1 Mar. 29, 2012

(30) Foreign Application Priority Data

Sep. 28, 2010 (KR) .................. 10-2010-0093705

(51) Int. Cl.
*H04N 13/04* (2006.01)
*G02B 27/22* (2006.01)
*G02F 1/133* (2006.01)

(52) U.S. Cl.
CPC ........ *H04N 13/0404* (2013.01); *G02B 27/2214* (2013.01)

(58) Field of Classification Search
CPC .......... H04N 13/0497; H04N 13/0404; H04N 13/0409; H04N 13/0422; G02B 27/2214
USPC ......................................... 348/51
See application file for complete search history.

(56) References Cited

U.S. PATENT DOCUMENTS

| 5,381,252 | A | * | 1/1995 | Chen .................... 349/5 |
| 5,526,146 | A | * | 6/1996 | Goodman et al. ............. 349/5 |
| 6,064,424 | A | | 5/2000 | Van Berkel et al. |
| 6,118,584 | A | | 9/2000 | Van Berkel et al. |
| 6,157,424 | A | * | 12/2000 | Eichenlaub ................ 349/74 |
| 7,071,608 | B2 | * | 7/2006 | Nakamura et al. ............ 313/495 |
| 7,327,929 | B2 | * | 2/2008 | Chien et al. .................. 385/146 |
| 7,750,988 | B2 | * | 7/2010 | Kim .............................. 349/44 |
| 7,889,152 | B2 | * | 2/2011 | Kim et al. ......................... 345/7 |
| 7,907,227 | B2 | * | 3/2011 | Oh .................................. 349/44 |
| 8,098,356 | B2 | * | 1/2012 | Itou et al. ..................... 349/141 |
| 8,154,799 | B2 | * | 4/2012 | Kim et al. ..................... 359/463 |
| 8,373,814 | B2 | * | 2/2013 | Jung et al. ...................... 349/43 |
| 2006/0103951 | A1 | * | 5/2006 | Bell et al. ..................... 359/737 |
| 2007/0257874 | A1 | * | 11/2007 | Kim ................................ 345/89 |
| 2008/0224976 | A1 | * | 9/2008 | Lee et al. ...................... 345/89 |
| 2008/0291268 | A1 | | 11/2008 | Berretty |

(Continued)

FOREIGN PATENT DOCUMENTS

EP 1154317 A2 11/2001
JP 06311535 A 4/1994

(Continued)

OTHER PUBLICATIONS

Joonku Hahn et al., "Real-time digital holographic beam-shaping system with a genetic feedback turning loop." Applied Optics, Feb. 10, 2006, pp. 915-924, vol. 45, No. 5.

*Primary Examiner* — Sath V Perungavoor
*Assistant Examiner* — Howard D Brown, Jr.
(74) *Attorney, Agent, or Firm* — Innovation Counsel LLP

(57) ABSTRACT

A liquid crystal lens unit is provided for use in an autostereoscopic 3D image display. Light passing through the liquid crystal lens unit is refracted by a liquid crystal layer arranged by an electric field. The voltage levels applied to the to the liquid crystal layer are periodically changed thereby periodically oscillating the position of the focus profile of the liquid crystal lens unit. As a result, moiré patterns are removed and display quality is improved.

16 Claims, 16 Drawing Sheets

(56) References Cited

U.S. PATENT DOCUMENTS

| | | |
|---|---|---|
| 2009/0128474 A1 | 5/2009 | Ijzerman |
| 2009/0153652 A1 | 6/2009 | Barenbrug |
| 2010/0079584 A1* | 4/2010 | Sung et al. .................. 348/52 |
| 2010/0157186 A1* | 6/2010 | Kim et al. ................... 349/39 |

FOREIGN PATENT DOCUMENTS

| | | |
|---|---|---|
| JP | 07084545 A | 3/1995 |
| JP | 2000047138 A | 2/2000 |
| JP | 2002196422 A | 7/2002 |
| JP | 2007322735 A | 12/2007 |
| JP | 4287105 B2 | 4/2009 |
| KR | 1020000062985 A | 10/2000 |
| KR | 1020040017048 A | 2/2004 |
| KR | 1020060058406 A | 5/2006 |
| KR | 1020090056032 A | 6/2009 |
| KR | 1020090111584 A | 10/2009 |

* cited by examiner $$V_1 = (v_1, v_2, v_3, \cdots, v_N)$$

S1

THREE DIMENSIONAL IMAGE DISPLAY

CROSS-REFERENCE TO RELATED APPLICATION

This application claims priority to and the benefit of Korean Patent Application No. 10-2010-0093705 filed in the Korean Intellectual Property Office on Sep. 28, 2010, the entire contents of which are incorporated herein by reference.

BACKGROUND OF THE INVENTION (a) Field of the Invention

The present invention relates to a three dimensional image display.

(b) Description of the Related Art

Currently, the ability to transmit information over communication networks at high speeds has allowed the development of multi-media that provides sight and sound based on a digital terminal processing of characters, audios, videos, etc., at high speeds, and in particular, the development of a three-dimensional stereoscopic information communications. Such three-dimensional stereoscopic information communication services provide a realistic three-dimensional image and accompanying sound to the user.

Generally, a stereoscopic image, which is an image represented in three-dimensions, is made according to a stereo vision principle in the eyes. In particular, parallax of the eyes, that is, a binocular parallax generated as the result of the eyes being spaced apart from each other by about 65 mm, may be the most important factor for creating a three-dimensional effect in an image. When the left eye and right eye each see a different two-dimensional image, and the two different images are then transferred to the brain, the brain accurately fuses images to reproduce the sense of depth of the image.

This capability is generally called stereography.

A stereoscopic image display device that uses binocular parallax to achieve the illusion of depth generally uses either a stereoscopic polarization scheme or an autostereoscopic scheme. In a stereoscopic polarization scheme, polarization and time division are used when displaying the image, and an observer must wear special glasses to see the image in three dimensions. In an autostereoscopic scheme an observer does not need additional glasses, and such autostereoscopic schemes can include, for instance, a parallax-barrier, lenticular, and/or blinking light schemes when displaying the image.

The stereoscopic polarization scheme has advantages in that, while users do need to wear special glasses, usually either polarization glasses or liquid crystal shutter glasses, they can view the stereoscopic images from a wide range of viewing angles. However, because viewers need to wear the separate polarization glasses or the liquid crystal shutter glasses, the stereoscopic polarization scheme is not practical for daily, routine use. As a result, the stereoscopic polarization scheme has been restrictively used in theaters, etc.

On the other hand, a variety of systems which utilize autostereoscopic schemes have been developed because they allow viewers to see the stereoscopic images without the use of special glasses. A disadvantage, however, of autostereoscopic systems is that they have a limited viewing angle, and the stereoscopic image can only be viewed at a specific distance and a specific position relative to the display.

Among the various autostereoscopic systems, stereoscopic display devices that use a lenticular lens are most suitable when considering the thickness and aperture ratio of the display device. In other words, using a lenticular lens is advantageous because the thickness of the display device can be made quite thin, and the use of the lens does not cover the display device. As a result, display devices that use a lenticular lens have been prevalently used and developed.

A stereoscopic image is created in a display device that utilizes a lenticular lens by refracting light from a display panel while it passes through the lenticular lens and polymer of the lenticular lens unit, which divides the progressing direction of light, passing the divided light through a polarizer, and inputting it to both eyes. As a result, light incident into a right eye and light incident into a left eye have different information, such that images are recognized three dimensionally.

A stereoscopic display device that uses a lenticular lens may have a problem in that a black matrix between the color filters is visualized at a specific position.

The view of the black matrix is periodically formed, such that Moiré-pattern artifacts may be formed in the stereoscopic display, which are distracting to the viewer. Also, the quality of the stereoscopic image is degraded because, at a position where the black matrix is displayed, the black matrix is viewed instead of the image, and the stereoscopic display is incomplete.

An additional problem is that the manufacturing process of lenticular lenses is complicated, such that it is difficult to stably secure the process and the yield is low, thereby reducing the economic feasibility of large scale production. In particular, it is difficult for the lenticular unit to be durable at high temperatures, and it is difficult to control the focal distance of the lenticular lens.

The above information disclosed in this Background section is only for enhancement of understanding of the disclosure and therefore it may contain information that does not form the prior art that is already known to a person of ordinary skill in the art.

SUMMARY OF THE INVENTION

A 3D image display capable of improving display quality by removing a moiré pattern and making a manufacturing process simple is provided.

A 3D image display having a liquid crystal lens unit is provided.

In one aspect, the 3D image display includes a display panel and a liquid crystal lens unit including a plurality of field generating electrode and a liquid crystal layer, wherein voltage applied to the plurality of field generating electrodes is fluctuated at a sufficiently high frequency so that a human visual system does not perceive flicker.

A focus profile of light that passes through the liquid crystal lens unit may be a single line.

Each of the field generating electrodes has a voltage level and a pattern of the voltage levels can be symmetrical about a central one of the plurality of field generating electrodes. The main idea is the dithering of the focus of the liquid crystal lens by circularly periodic shifting the input voltage levels (v1, v2, v3, ..., vn).

The voltage level applied to each of the field generating electrodes periodically may shift to an adjacent one of the field generating electrodes.

A position of the focus profile oscillates from side to side.

A distance that the focus profile oscillates from side to side corresponds to a width of one subpixel in the display panel to display an image.

The display panel may include a color filter surrounded by a black matrix.

The width of one subpixel may include a width of the color filter and a width of at least a part of the black matrix surrounding the color filter.

In another aspect, the focus profile of the liquid crystal lens unit may be displayed by two or more lines.

Each of the field generating electrodes has a voltage level and a pattern of the voltage levels is symmetrical about a central one of the plurality of field generating electrodes.

An interval between two or more lines of the focus profile may be oscillated within a predetermined spatial range.

The interval between the two or more lines of the focus profile corresponds to a width of one subpixel in the display panel to display an image The display panel may include the color filter surrounded by a black matrix.

The width of one subpixel may include the width of one color filter and the width of at least a portion of the black matrix surrounding the color filter.

The display panel includes a N pixel array, and a size and position of the liquid crystal lens unit corresponds to a size and position of the N pixel array.

Each pixel in the N pixel array includes three-color subpixels of red, green, and blue, and the subpixels in the N pixel array are arranged in the row direction in order of subpixels of red, green, and blue and are arranged in the column direction in order of subpixels of red, green.

In one aspect, all of the field generating electrodes may be formed on the same layer.

In another aspect, the field generating electrodes may be formed on two layers.

The liquid crystal lens unit may further include a polarizer on to the outer side thereof.

DETAILED DESCRIPTION OF THE EMBODIMENTS

Figure 1:
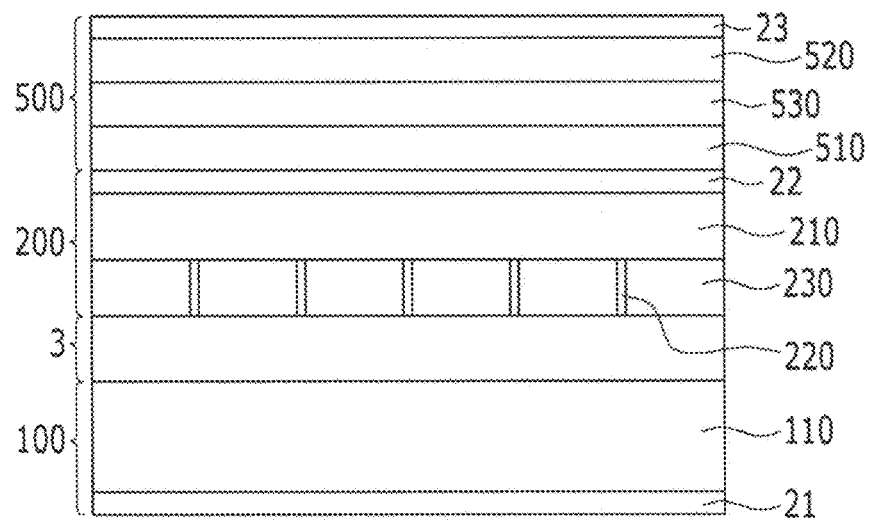
FIG. 1 is a cross-sectional view of a 3D image display according to an exemplary embodiment.

Exemplary embodiments will be described hereinafter with reference to the accompanying drawings. As persons of ordinary skill in the relevant art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Hereinafter, a 3D image display according to an exemplary embodiment will be described in detail with reference to the accompanying drawings.

FIG. 1 is a cross-sectional view of a 3D image display according to an exemplary embodiment.

As shown in FIG. 1, the 3D image display includes a display panel 100, 3, and 200 and a liquid crystal lens unit 500.

The display panel 100, 3, and 200 is configured to include a lower panel 100 (referred to as thin film transistor array panel), a liquid crystal layer 3 and an upper panel 200 (referred to as a color filter display panel).

In the lower panel 100, a gate line transferring gate signals, a data line transferring data voltage, a thin film transistor (or a switching device) connected to a gate line and a data line, and a pixel electrode connected to an output terminal of the thin film transistor, etc., are formed (not shown) on an insulating substrate 110. A lower polarizer 21 is attached to the rear of the insulating substrate 110.

In the upper panel 200, an insulating substrate 210 is provided. A black matrix 220 is formed on the insulating substrate 210 in a lattice-type structure having openings. A color filter 230 may be disposed on insulting substrate 210 in the openings formed by the black matrix 220. A common electrode (not shown) is formed on the black matrix 220 and the color filter 230. An upper polarizer 22 is attached to the upper panel 200 on the opposite side of the upper panel from the black matrix 220.

The liquid crystal layer 3 is disposed between the lower panel 100 and the upper panel 200. The alignment direction of the liquid crystal molecules in liquid crystal layer 3 changes when an electric field is formed between the common electrode and the pixel electrode. In FIG. 1, the display is, by way of example, described as a liquid crystal display, but various other flat display panels (e.g., a plasma display panel, a light emitting diode (LED) display panel, an electrophoresis display panel, etc.) may also be used. In addition, when the color display is unnecessary, the color filter 230 may be omitted.

The display panel 100, 3, and 200 by itself can display only 2D images. The liquid crystal lens unit 500 makes it possible to display 3D stereoscopic images.

A liquid crystal lens unit 500 includes a lower substrate 510, an upper substrate 520, a lens liquid crystal layer 530 disposed between two substrates 510 and 520, and a polarizer 23 attached to the outside of the upper substrate 520. The polarizer 23 polarizes light emitted from the 3D image display into a one-side polarization direction to improve the display quality, but it may be omitted.

Figure 2:
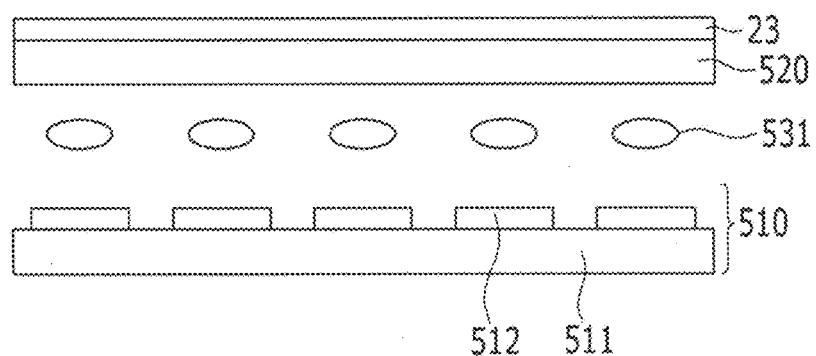
FIG. 2 is a cross-sectional views showing in detail a cross section of a liquid crystal lens unit in a 3D image display according to an exemplary embodiment.
Figure 3A:
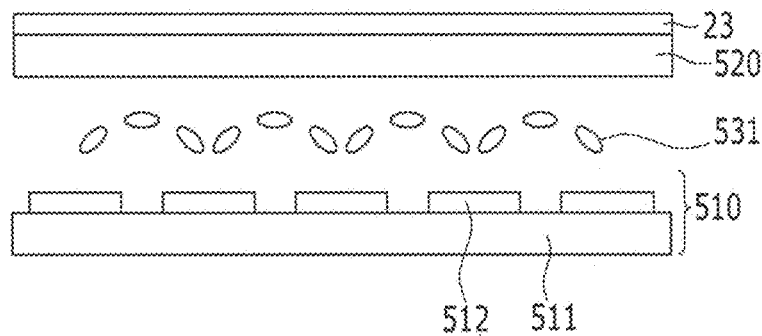
FIG. 3A is a cross-sectional views showing in detail a cross section of a liquid crystal lens unit in a 3D image display with a voltage applied according to an exemplary embodiment.
Figure 3B:
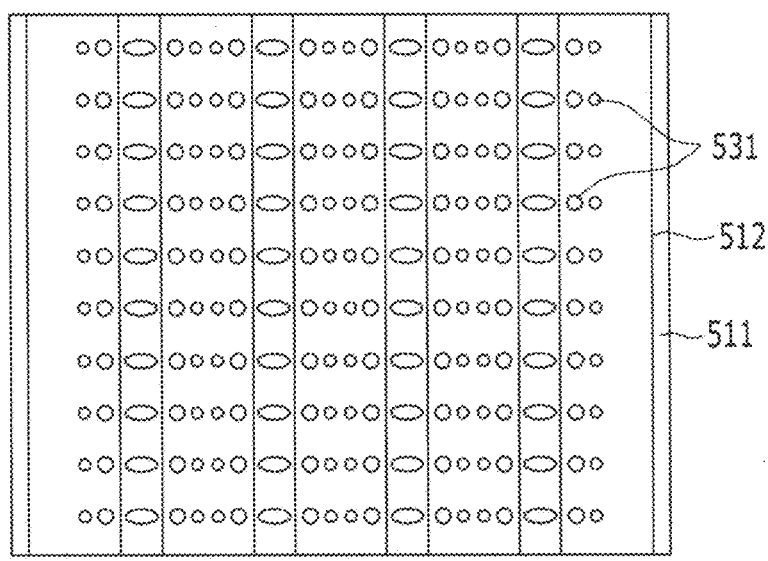
FIG. 3B is a plan view showing in detail a liquid crystal lens unit in a 3D image display with a voltage applied according to an exemplary embodiment.
Figure 4:
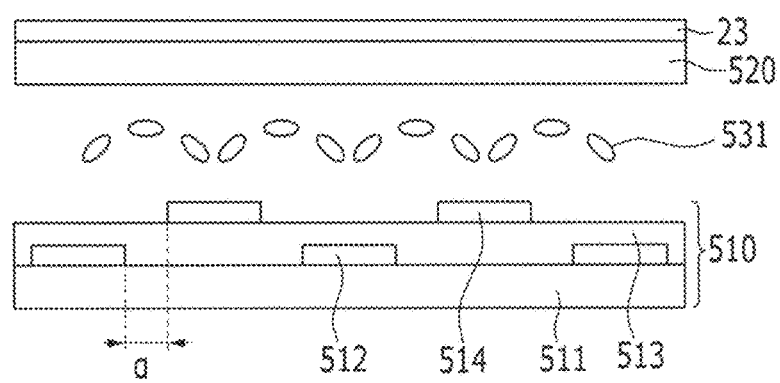
FIG. 4 is a cross-sectional view showing in detail a cross-section of a liquid crystal lens unit according to another exemplary embodiment.

FIGS. 2 to 4 show in detail the liquid crystal lens unit 500 according to an exemplary embodiment.

FIGS. 2 and 3A are cross-sectional views showing in detail a cross section of a liquid crystal lens unit in a 3D image display according to an exemplary embodiment and FIG. 4 is a cross-sectional view showing in detail a cross-section of a liquid crystal lens unit according to another exemplary embodiment. FIG. 3B is a plan view of the liquid crystal lens unit FIG. 3A.

First, a liquid crystal lens unit according to exemplary embodiment will be described with reference to FIGS. 2 and 3.

FIGS. 2 and 3A show the change in characteristics according to the alignment of the liquid crystal molecules 531 in the lens liquid crystal layer 530 in relation to the lower substrate 510, which includes the insulating substrate 511 and the field generating electrode 512 formed thereon.

Referring to the lower substrate 510 of FIG. 2, the field generating electrodes 512 are formed on the insulating substrate 511. FIG. 2 illustrates the case in which no electric field is applied to the field generating electrodes 512, and the liquid crystal molecules 531 are horizontally aligned. In other embodiments, the liquid crystal molecules may have other alignment directions when there is no electric field applied to the field generating electrodes 512, the alignment direction depending on the characteristics of the liquid crystal molecules 531. For instance, the liquid crystal molecules may be vertically aligned when there is no electrode field applied. In the state shown in FIG. 2, images displayed on the display panel 100, 3, 200 are displayed as 2D images as they are. To this end, the initial alignment direction of the liquid crystal molecules 531 and the transmission axis direction of the polarizer 23 can be appropriately arranged.

FIGS. 3A and 3B show a state in which voltage is applied to the field generating electrodes 512 to change the alignment direction of the liquid crystal molecules 531 according to electric field. The field generating electrodes 512 generate a side-to-side electric field as a result of a high voltage being applied to one of two adjacent electrodes and low voltage being applied to the other of the two, such that the liquid crystal molecules 531 change the alignment direction. When the liquid crystal molecules change alignment direction as illustrated in FIGS. 3A and 3B, a lenticular lens is formed. Light emitted from the display panel that enters the liquid crystal lens unit 500 thus changes direction when passing through the lenticular lens created by the liquid crystal molecules 531, thereby resulting in a 3D stereoscopic image.

As shown in FIGS. 3A and 3B, when voltage is applied to the field generating electrodes 512 as described above, liquid crystal molecules 531 in liquid crystal lens unit 530 are aligned in a repeating structure, and the structure repeats in one direction at a predetermined distance. As a result, light that enters the liquid crystal lens 500 from the display panel is refracted. In the structure in which the liquid crystal molecules 531 are periodically and repeatedly aligned, one unit structure having a set number of field generating electrodes (for instance, 35, but that number can be varied) arranged in a row across the unit is referred to herein as a "liquid crystal lens unit."

In the present exemplary embodiment the field generating electrodes 512 are formed on only the lower substrate 510. However, they may be formed on only the upper substrate 520 or on the upper substrate 520 and the lower substrate 510, respectively, according to other exemplary embodiments. In addition, FIG. 3 shows that the liquid crystal molecules 531 have an arched structure between the adjacent field generating electrodes 512, however various other alignments are possible.

FIG. 4 shows a liquid crystal lens unit 500 according to another exemplary embodiment. The exemplary embodiment of FIG. 4 shows a structure in which the field generating electrodes formed on the lower substrate 510 are formed in two layers.

In other words, the lower substrate 510 according to the exemplary embodiment of FIG. 4 has a structure in which the lower field generating electrodes 512 are formed on the insulating substrate 511, and the upper field generating electrodes 514 are then formed on the insulating layer 513 that covers the lower field generating electrodes 512.

The exemplary embodiment shows that the lower field generating electrodes 512 and the upper field generating electrodes 514 are formed to allow the horizontal distance thereof to be spaced apart from each other by a distance α but the exemplary embodiment may be applied to the case in which the value of the distance α is 0, or the lower field generating electrode 512 and the upper field generating electrode 514 may be partially overlapped.

As shown in FIG. 4, the lower field generating electrodes 512 and the upper field generating electrodes 514 may accurately control the orientation of the liquid crystal molecules 531 by forming a tighter electric field that is applied to the lens liquid crystal layer 530.

FIG. 4 shows that the liquid crystal molecules 531 have an arched structure between the adjacent upper and lower field generating electrodes 514 and 512, which may have various alignments according to the exemplary embodiment.

Hereinafter, the focus profile formed by the liquid crystal lens unit 530, and the voltage distribution applied to the field generating electrodes to form the focus profile, will be described with reference to FIGS. 5 and 6.

Figure 5:
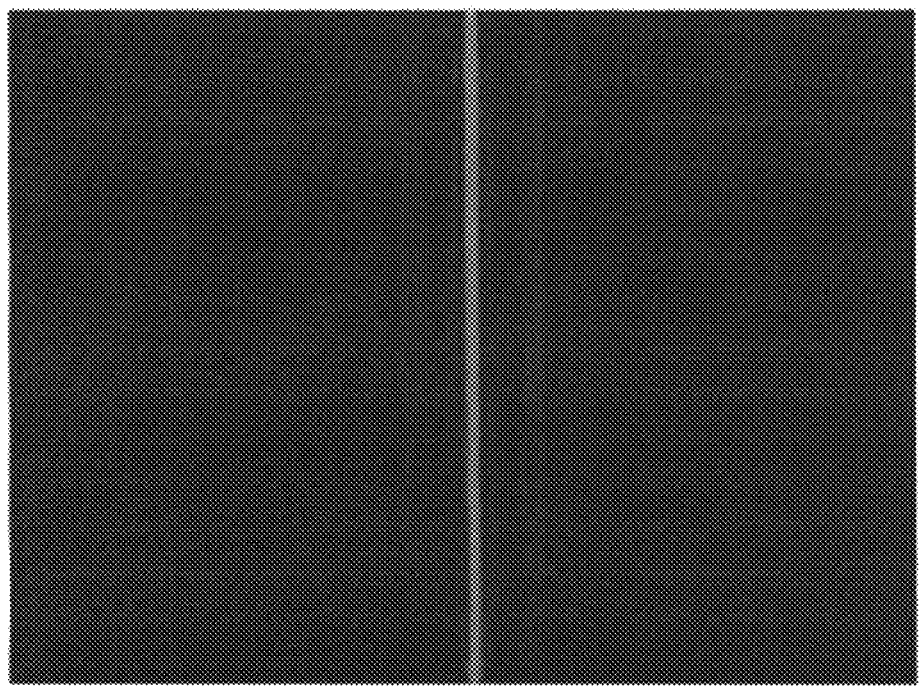
FIG. 5 is a photograph of an experimental result measuring a focus profile of a liquid crystal lens unit according to an exemplary embodiment.
Figure 6:
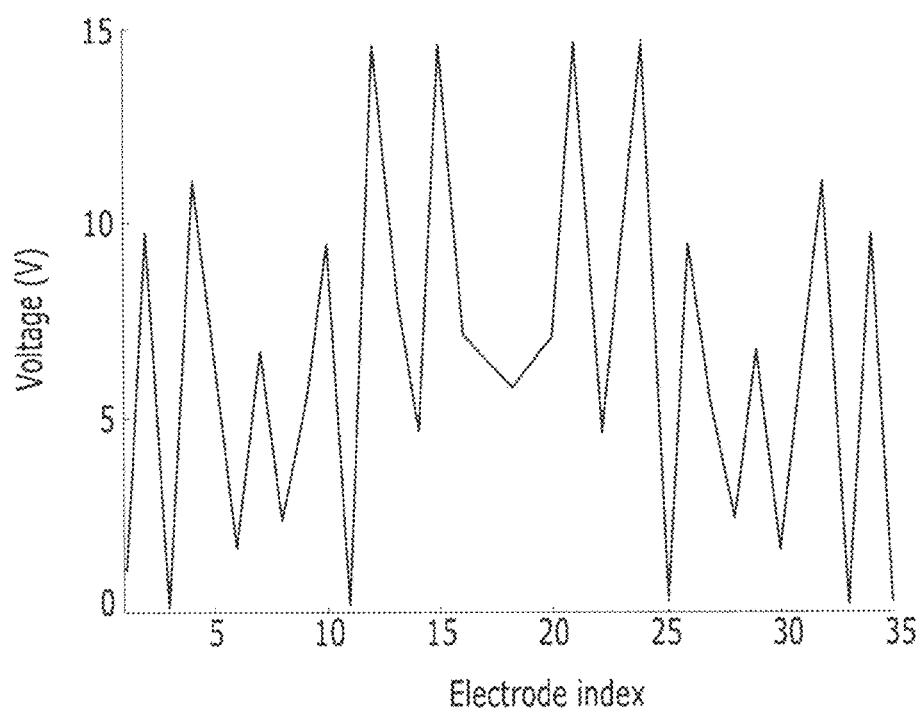
FIG. 6 is a graph showing a distribution of input voltage applied to the liquid crystal lens unit of FIG. 5.

FIGS. 5 and 6 show the focus profile and the voltage distribution implemented using the liquid crystal lens unit 530 according to the exemplary embodiment of FIG. 2, where one liquid crystal lens unit is used.

FIG. 5 is a photograph of an experimental result that shows the focus profile for light that has passed through the liquid crystal lens unit according to an exemplary embodiment and FIG. 6 is a graph showing a distribution of input voltage applied to the field generating electrodes in the liquid crystal lens unit of FIG. 5.

As shown in FIG. 5, light passing through the liquid crystal lens unit comes together (converges) into a single line, referred to herein as the focus profile. As described above, the liquid crystal lens unit refracts and focuses light. In the image display device used for FIG. 5, the distance between the liquid crystal lens unit 500 and the color filter 230 (FIG. 1) is set to about 2 mm.

In order to produce the focus profile as shown in FIG. 5, voltage is applied to the field generating electrodes of the liquid crystal lens unit as in FIG. 6. FIG. 6 shows the voltage level for each field generating electrode (indicated in the figure as the "electrode index" N, where each electrode is labeled $P_1, P_2, P_3 \ldots P_N$) across the liquid crystal lens. Thus, in the example illustrated in FIG. 6, there are 35 electrodes lined up across the liquid crystal lens, with electrode 18 located in the middle, or central position. As can be appreciated from FIG. 6, the voltage profile applied to the left and right electrodes is symmetrical about the position of the central electrode, 18, such that the focus profile is a single line. This voltage profile is periodically, and circularly, shifted through each of the electrodes in the lens unit. Thus, the voltage profile shown in FIG. 6 is a voltage profile at the beginning, i.e., the first step, in the rotation of voltage levels over the electrodes. As the voltage profile is rotated through the electrodes, the pattern becomes asymmetrical about the central electrode 18 (until it is back to the starting profile). Periodically shifting the voltage profile through each of the electrodes causes the location of the focus profile to move, so that it oscillates periodically, for inducing a moiré dithering effect.

In the exemplary embodiments, the position of the focus profile of a liquid crystal lens unit having a single focus profile (as shown in FIGS. 5 and 6) is oscillated, i.e., moved back and forth. An exemplary embodiment illustrating such oscillation will be described with reference FIGS. 7 and 8.

Figure 7:
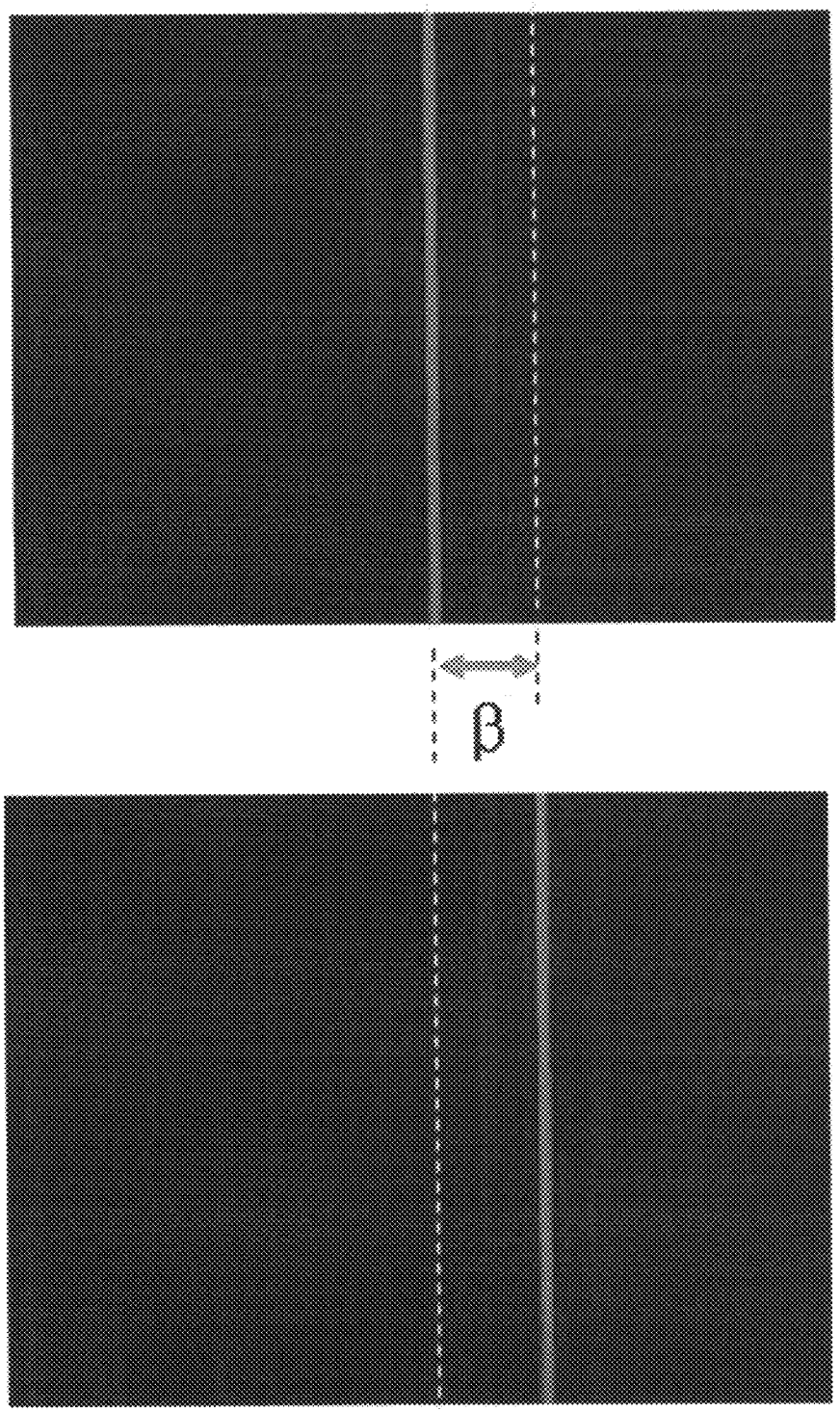
FIG. 7 is a diagram showing a focus position change of a liquid crystal lens unit according to an exemplary embodiment.
Figure 8:
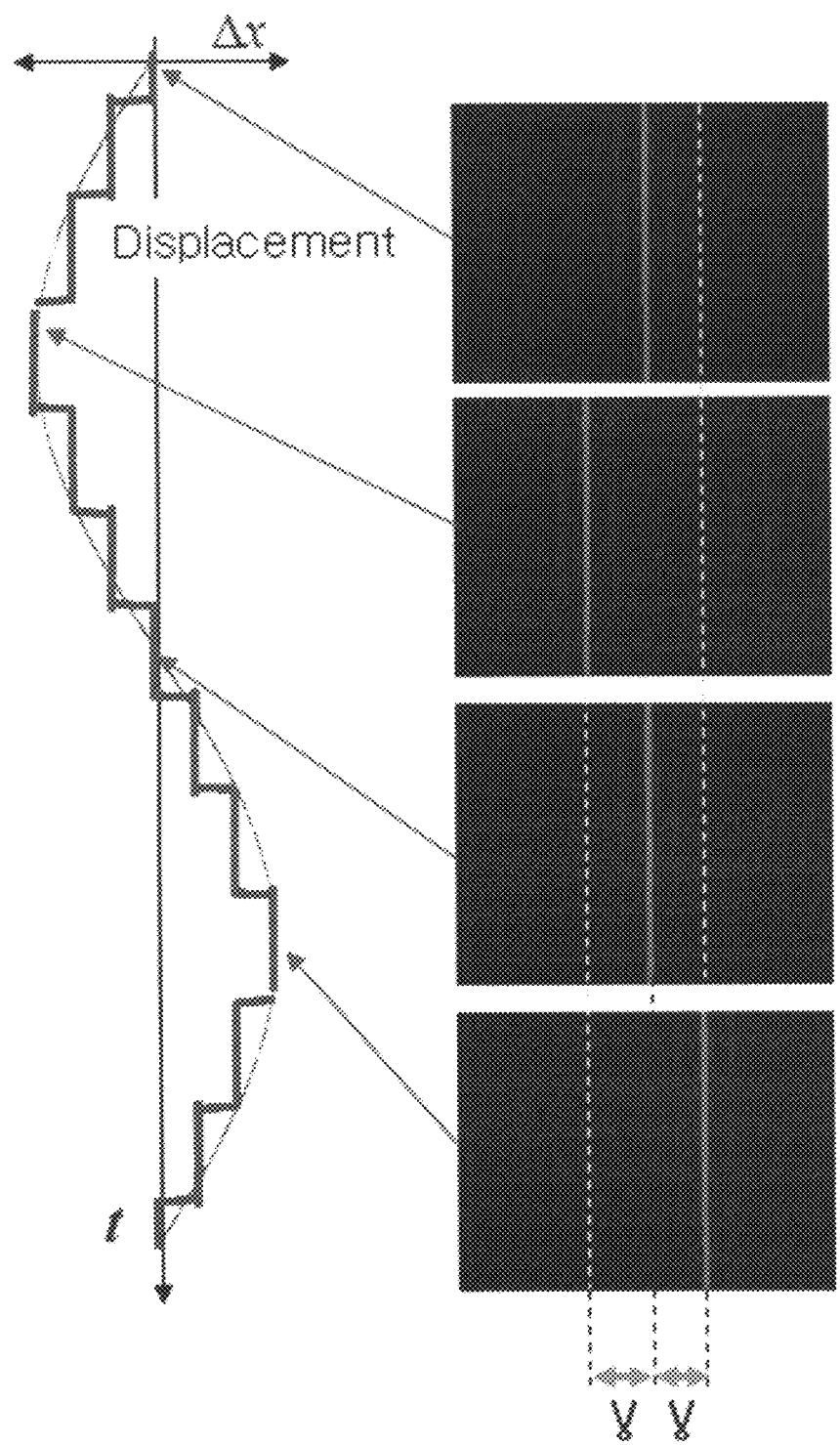
FIG. 8 is a diagram showing a periodic vibration of a liquid crystal lens unit according to an exemplary embodiment.

FIG. 7 is a diagram showing the change in position of the focus profile of a liquid crystal lens unit according to an exemplary embodiment and FIG. 8 is a diagram showing a periodic oscillation of the position of the focus profile of a liquid crystal lens unit according to an exemplary embodiment.

As described above, in order to refract light, the liquid crystal lens unit aligns the liquid crystal molecules 531 according to the electric field generated by applying voltage to the field generating electrodes 512. When the voltage applied to the field generating electrodes 512 is changed, the alignment direction of the liquid crystal molecules 531 is changed, and the refraction characteristic of the liquid crystal lens is thus changed as well. In addition, when the voltage applied to each of the field generating electrodes 512 is shifted in a lateral direction, such that after the shift, each field generating electrode 512 has the voltage that was applied to its right or left adjacent field generating electrode 512 before the shift, the focus position onto which light converges is shifted laterally as shown in FIG. 7.

That is, when moving and applying the applied voltage to field generating electrodes 512 spaced apart by distance $\beta$ (which can be, for example, the distance $\alpha$ between field generating electrodes 512, 514 in FIG. 4, or it may be $2\alpha$ or $3\alpha$ if, respectively, it is a distance between 2 or 3 electrodes), the position of focus profile as shown in the upper figure of FIG. 7 is changed so that it has a position of the focus profile as shown in the lower figure of FIG. 7. That is, the position of the focus profile shifts by the distance $\beta$.

In the liquid crystal lens unit used to generate the focus profile of the upper figure of FIG. 7, the number of field generating electrodes in the liquid crystal lens unit is N, each electrode is labelled $P_1, P_2, P_3 \ldots P_N$, and the voltage applied to each electrode is $V_1, V_2, V_3 \ldots V_N$. For generating the focus profile as shown in the lower figure of FIG. 7, the voltage applied to each field generating electrode is shifted, so that the voltage applied to a field generating electrode in generating the upper figure of FIG. 7 is shifted to the field generating electrode spaced apart from it by $\beta$. For example, when $\beta$ is a three electrode interval, the voltage applied to electrodes $P_1$, $P_2, P_3, P_4 \ldots P_N$ each become $V_{N-2}, V_{N-1}, V_N, V_1 \ldots V_{N-3}$ in order to generate the focus profile at the position as shown in the lower figure of FIG. 7.

As shown in FIG. 8, the position of the focus profile of the liquid crystal lens unit is repeatedly oscillated back and forth over a predetermined displacement distance and a predetermined period.

FIG. 8 illustrates an exemplary embodiment in which the maximum displacement of the focus profile of the liquid crystal lens unit is $2\gamma$ and the focus profile is vibrated left and right as much as $\gamma$ about the center. In this case, as shown in FIG. 8, the frequency of the oscillation between left and right may be, for example, 60 Hz or more. The frequency of the oscillation of the position of the focus profile is determined by the frequency of shifts in position of the high and low voltages over the field generating electrodes, described above, which are determined by the fluctuations in the electric field applied to each of the field generating electrodes. Thus, when the electric field applied to each of the field generating electrodes is fluctuated by, e.g., 60 Hz, the oscillation in position of the focus profile between left and right is 60 Hz. In general, the oscillation in position of the focus profile only needs to be at sufficiently high frequency so that the viewer (i.e., the human visual system) does not specifically perceive the oscillations, i.e., see flicker. The viewer should only see the 3D image and should not be able to perceive the change in position of the focus profile. This generally occurs at a frequency of about 60 Hz or more.

When the focus profile of the liquid crystal lens unit is oscillated left and right as illustrated in FIG. 8, the moiré pattern that can be generated while the black matrix is viewable may be removed. That is, when the focus profile is at a fixed position, there is a single position at which the black matrix can be seen, such that the 3D display characteristics are deteriorated at the corresponding position. However, when the focus profile is oscillated side to side as shown in FIG. 8, it is integrated over time with the section in which the black matrix is not shown, even though the black matrix is instantaneously displayed. As a result, the display quality is not deteriorated and the moiré pattern that is caused by the black matrix is not seen by the viewer.

The alignment of the liquid crystal lens unit with the display panel, and the display characteristics resulting from oscillation of the position of the focus profile will be described with reference to FIGS. 9 to 11.

Figure 9:
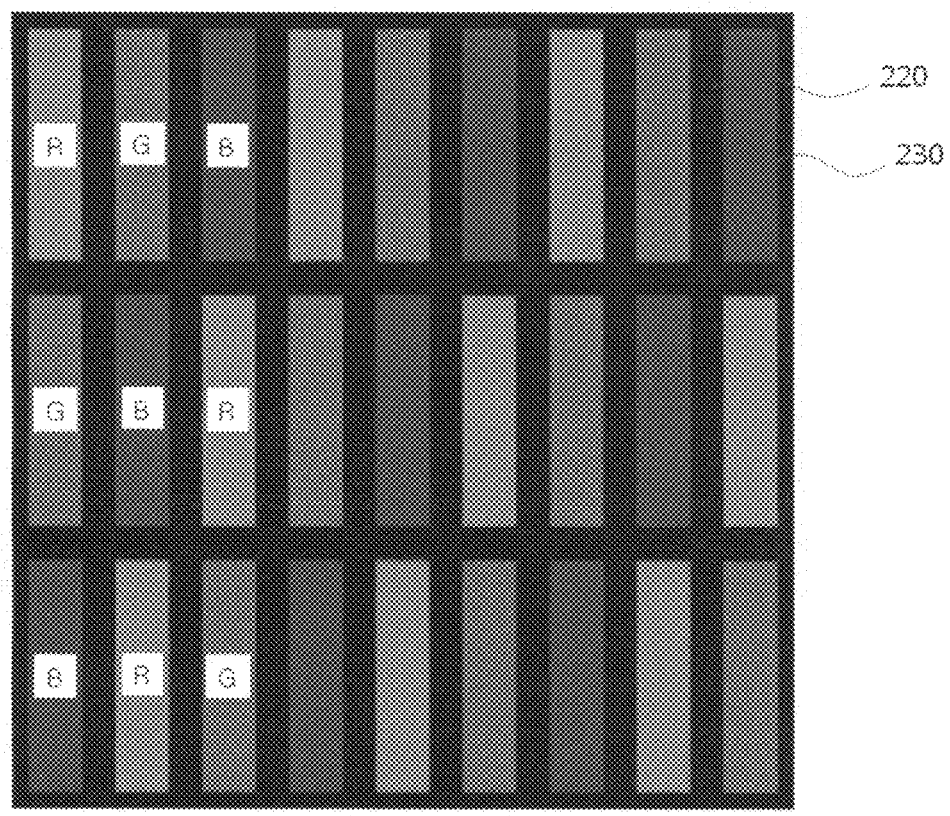
FIG. 9 is a diagram showing a black matrix and a color filter of a display panel corresponding to a single liquid crystal lens according to an exemplary embodiment.
Figure 10:
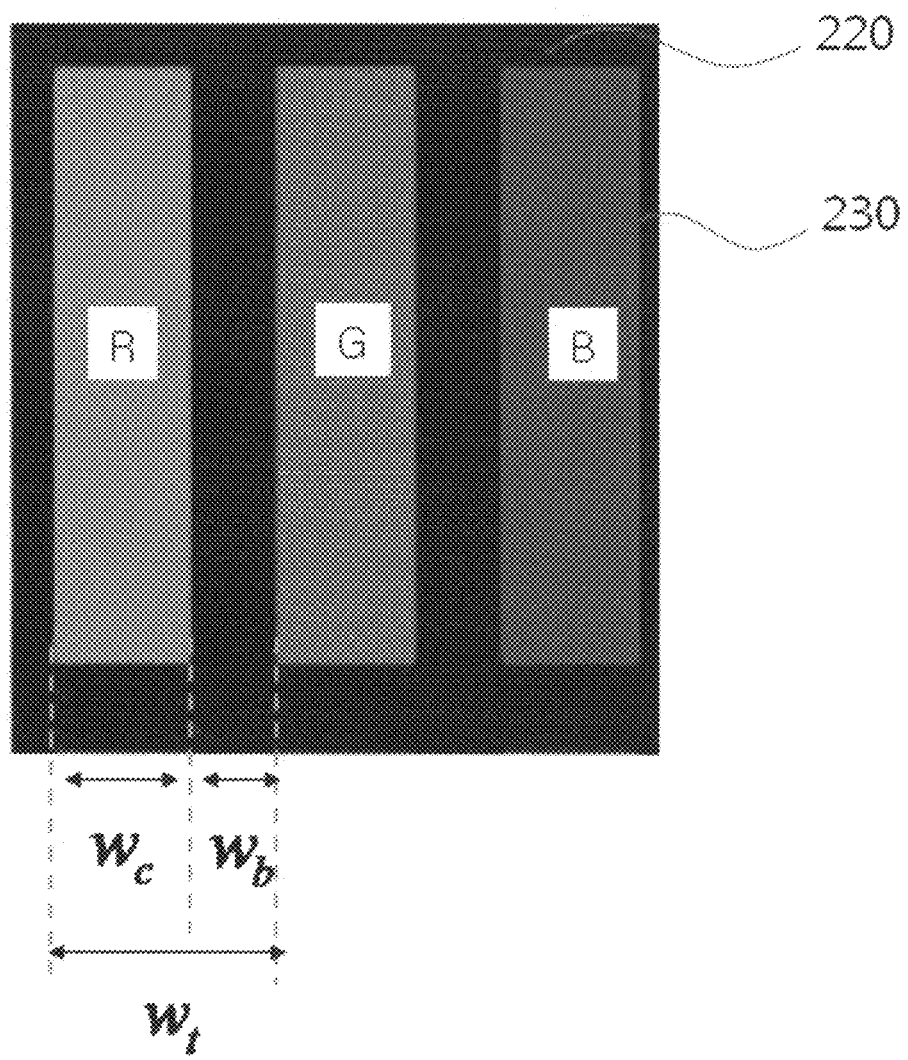
FIG. 10 is an enlarged diagram showing a black matrix and a color filter of a display panel according to an exemplary embodiment.
Figure 11:
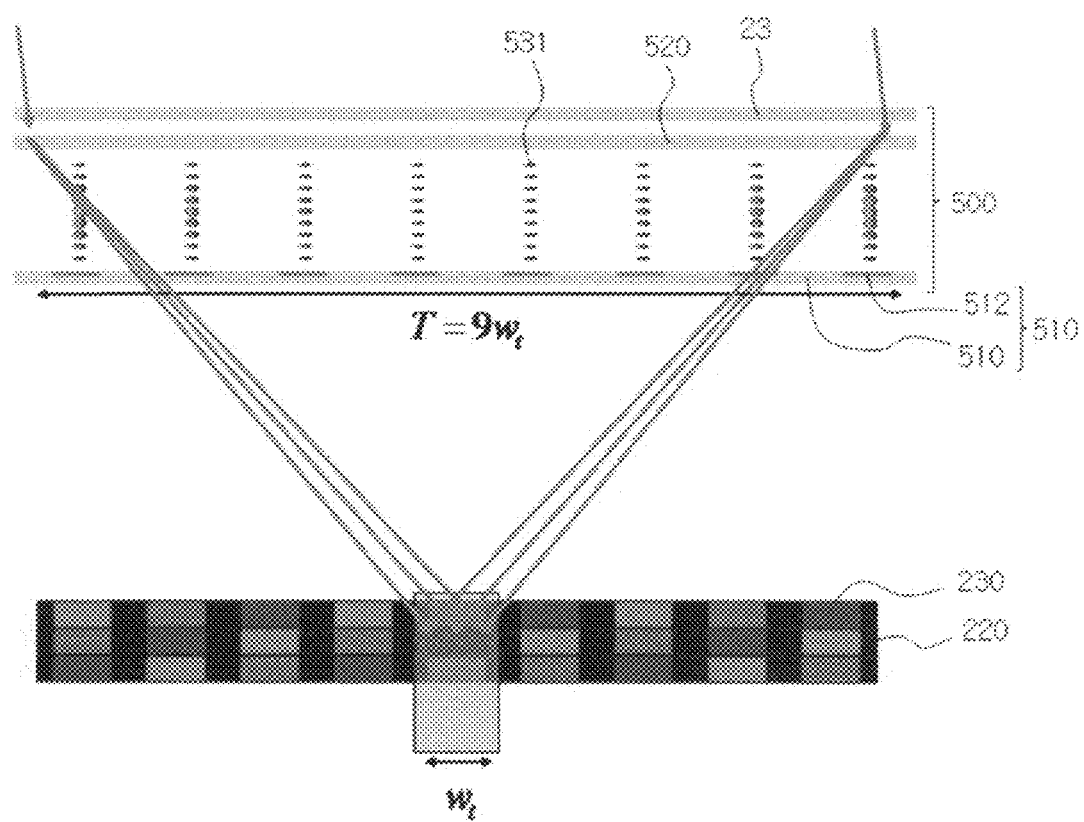
FIG. 11 is an enlarged cross-sectional view showing a liquid crystal lens unit and a black matrix and a color filter unit of a display panel in a 3D image display according to an exemplary embodiment.

FIG. 9 is a diagram showing a black matrix and a color filter of a display panel corresponding to a single liquid crystal lens according to an exemplary embodiment, FIG. 10 is an enlarged diagram showing a black matrix and a color filter of a display panel according to an exemplary embodiment, and FIG. 11 is an enlarged cross-sectional view showing a liquid crystal lens unit, a black matrix and a color filter unit of a display panel in a 3D image display according to an exemplary embodiment.

FIG. 9 shows a plan view of a portion of a pixel, specifically the black matrix 220 and color filter 230, of the display panel as aligned with (and under) the liquid crystal lens unit (not shown in figure) according to an exemplary embodiment. FIG. 9 shows a 3*3 pixel array, wherein one pixel is obtained by summing 3 subpixels of red(R), green(G), and blue(B). One liquid crystal lens unit corresponds to the 3*3 pixel array. The liquid crystal lens unit generates the focus profile in a column direction (as shown in FIG. 7), such that the pixels can be consecutively arranged in up and down directions (columns) as shown in the pixel arrangement illustrated in FIG. 9. The focus profile shown in FIG. 5 is parallel to the vertical line of the pixel array as shown in FIG. 9. The focus profile may oscillate along the horizontal direction of FIG. 9 periodically over the entire 9 sub-pixels.

As shown in FIG. 9, the 3*3 pixel array is sequentially arranged so that the subpixels have an order of red, green, and blue in a row direction and are also arranged so that the first subpixels of each pixel have an order of red, green, and blue in the column direction.

Further, in the case of the exemplary embodiment shown in FIG. 9, the three pixels formed in one pixel column may be applied with the same image data voltage. That is, the subpixels of red(R), green (G) and blue (B) positioned in one pixel column each have the same image data voltage applied to them.

In various other embodiments, however, the pixels corresponding to the liquid crystal lens unit may be varied, and the image data voltage applied to each pixel may also be varied from what is illustrated in FIG. 9.

In the case where the pixels and subpixels are arranged corresponding to the liquid crystal lens unit as shown in FIG. 9, the three pixels formed in one pixel column (i.e., a 1*3 pixel array) to which the same image data voltage is applied become one unit pixel, thereby displaying one image. The reason for this is that the focus profile of the liquid crystal lens unit has a vertical direction. Even though the black matrix is viewable, by oscillating the position of the focus profile of the liquid crystal lens unit, the images of the black matrix and color pixels are mixed over time. The image that is actually recognized is the time-averaged image of the black matrix and color filters.

FIG. 11 shows the range of the image displayed through the vibration of the liquid crystal lens unit. Prior to the description thereof, the width of the black matrix and the color filter is defined with reference to FIG. 10.

According to FIG. 10, a width of a color filter is Wc, a width of a black matrix is Wb, and a width of a subpixel summing them is Wt.

FIG. 11 shows a black matrix 220 and color filter 230 of the upper panel 200, and the liquid crystal lens unit 500. The liquid crystal lens unit is shown in cross-section, but for purposes of explanation, the color filter 230 is shown in a compressed plan view. That is, the black matrix 220 and color filter 230 shown in FIG. 11 correspond to nine subpixels as shown in FIG. 10 (i.e., a plan view) that are compressed for purposes of illustration. In the actual device the black matrix 220 and color filter 230 overlay the liquid crystal lens unit (FIG. 1). Referring to FIG. 11, the liquid crystal lens unit illustrated corresponds to 9 subpixels, such that it has a width of 9 Wt. The width ($\gamma$) of the oscillations of the position of the focus profile of the liquid crystal lens unit needs to be controlled so as to display the image while corresponding to the width Wt of the subpixel array used in the display.

As described above, when the position of focus profile is oscillated, that is, moved back and forth, the display quality is improved and the moiré pattern is removed.

In addition, when the oblique line is displayed on the display panel, the pixel has a quadrangular structure, such that conventionally the oblique line displayed is not smooth, but has, for instance, a sawtooth shape. Generally, in order to solve the problem, the rendering processing is performed. But when the position of the focus profile is oscillated as in the present exemplary embodiments, it is recognized by a viewer as being timely integrated with the display of the adjacent regions, such that the oblique line can be smoothly displayed without performing the separate rendering processing.

The case where the focus profile of the liquid crystal lens unit is displayed by a single line as shown in FIG. 5 was described above.

Hereinafter, the case where the focus profile of the liquid crystal lens unit is displayed by two lines will be described with reference to FIGS. 12 and 13.

Figure 12:
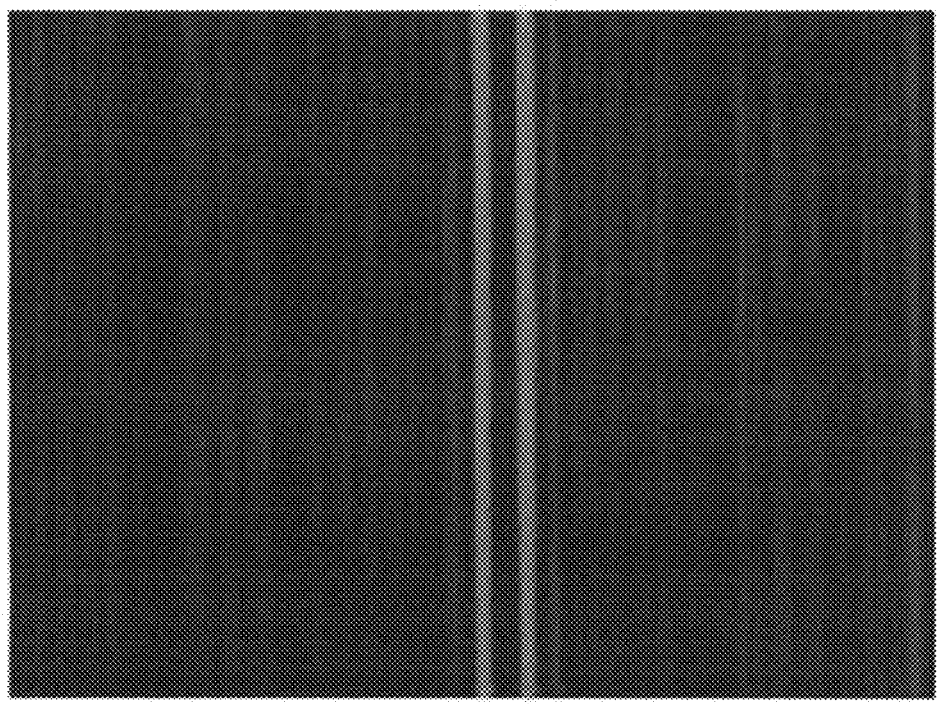
FIG. 12 is a photograph of an experimental result for measuring a focus profile of a liquid crystal lens unit according to another exemplary embodiment.
Figure 13:
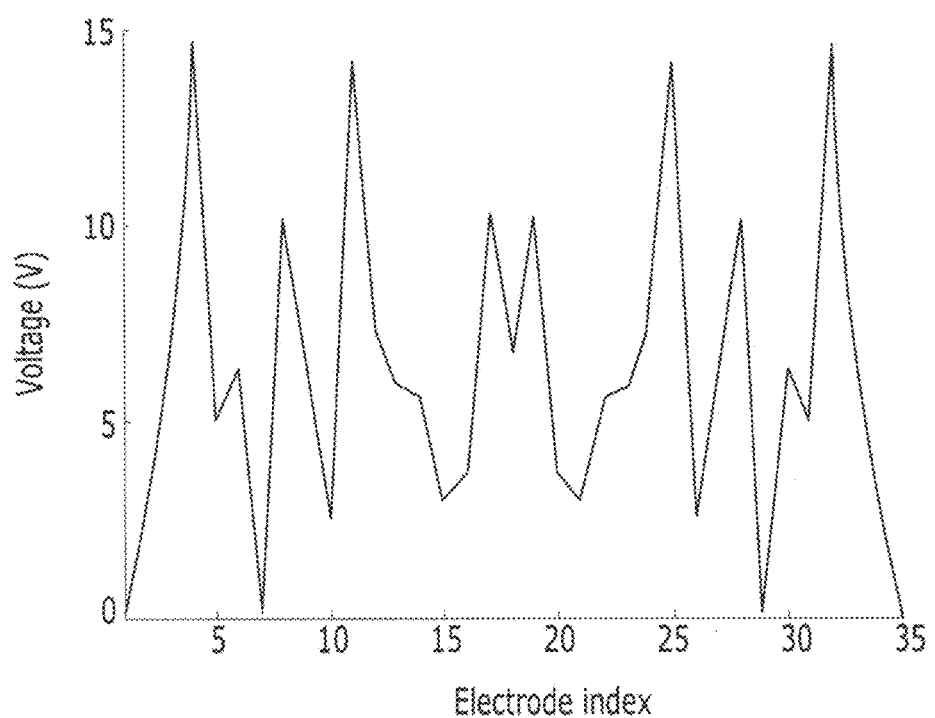
FIG. 13 is a graph showing a distribution of input voltage applied to a liquid crystal lens unit of FIG. 12.

FIG. 12 is a photograph showing a focus profile of a liquid crystal lens unit according to another exemplary embodiment and FIG. 13 is a graph showing a distribution of input voltage applied to a liquid crystal lens unit used to produce the focus profile of FIG. 12.

As shown in FIG. 12, light passing through the liquid crystal lens unit is focused into two lines. In FIG. 12, the distance between the liquid crystal lens unit and the color filter are set to about 2 mm and is measured.

To produce the focus profile as shown in FIG. 12, the voltage as shown in FIG. 13 is applied to the field generating electrodes of the liquid crystal lens unit. Similar to FIG. 6, FIG. 13 shows the voltage level for each field generating electrode (indicated in the figure as the "electrode index" N, where each electrode is labeled, e.g. $P_1, P_2, P_3 \ldots P_N$) across the liquid crystal lens. As can be appreciated from FIG. 13, voltage applied to left and right electrodes is symmetrical about the central electrode, 18, and unlike FIG. 6, each has one local maximum value at both sides based on the center, but another local maximum value does not exist within a predetermined distance from the local maximum values. As described above, the voltage of the maximum value adjacent to the center forms the focus profile as shown in FIG. 12 by two lines. (For reference, in FIG. 6, it does not have the maximum value over a predetermined distance about the center and thus, it has one focus profile.)

Figure 14:
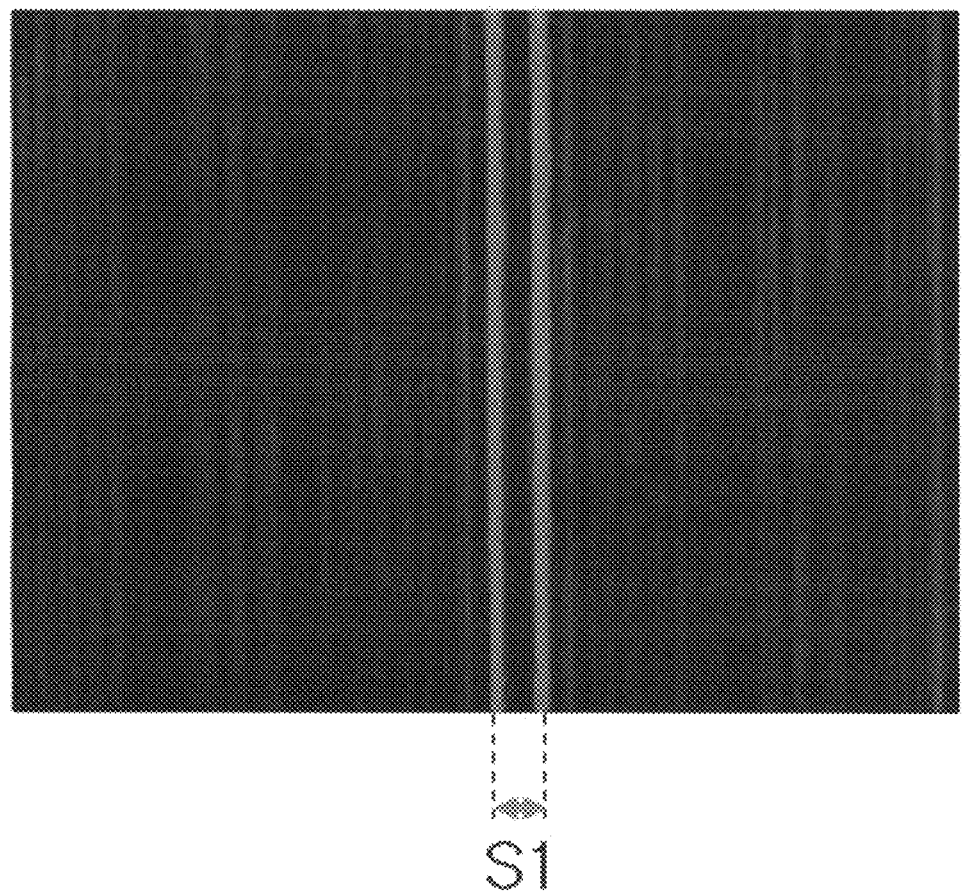
FIGS. 14 and 15 are diagrams each showing a focus position change liquid crystal lens unit according to another exemplary embodiment.
Figure 15:
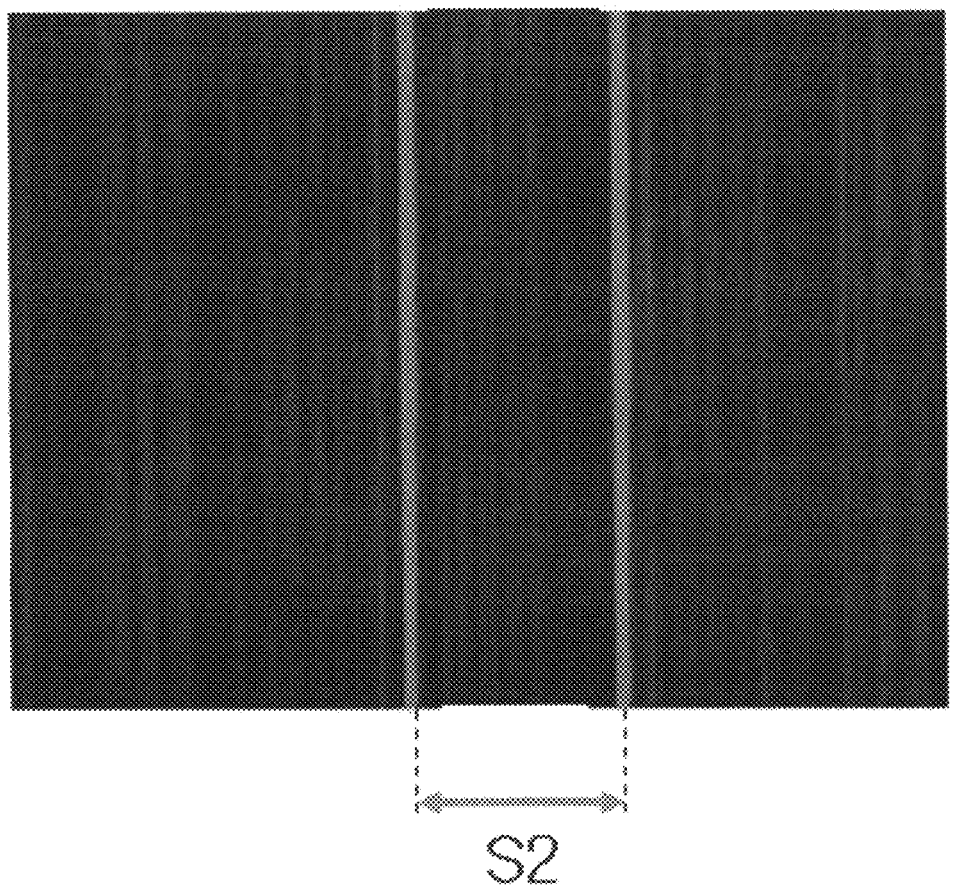
Figure 16:
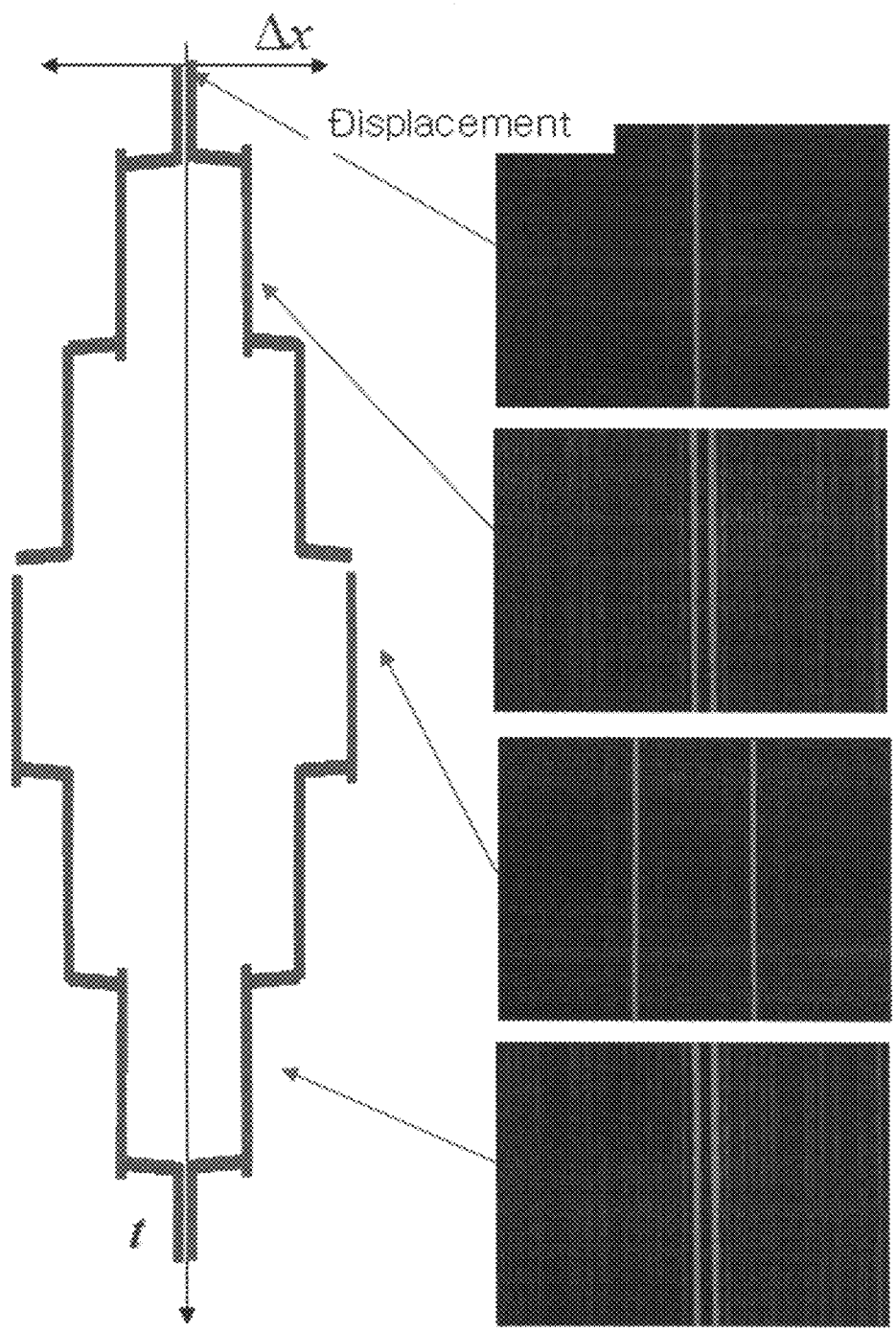
FIG. 16 is a diagram showing a periodic vibration of a liquid crystal lens according to another exemplary embodiment.

FIGS. 14 and 15 are diagrams each showing the change in focal position of a liquid crystal lens unit according to another exemplary embodiment of the present invention and FIG. 16 is a diagram showing a periodic oscillation of a liquid crystal lens unit according to another exemplary embodiment of the present invention.

As shown above with respect to FIGS. 7 and 8, when the voltage applied to the field generating electrodes is changed, the position of the focus profile at which light is collected is shifted. Such shifts are illustrated for a focus profile having two lines in FIGS. 14 and 15 below.

FIG. 14 shows the case in which the interval between two lines of the focus profile is S1. In this case, voltage applied to the field generating electrode is defined as $V_1, V_2, V_3 \ldots V_N$.

In addition, as shown in FIG. 15, in the case of when the interval between the two lines of the focus profile is S2, the voltage applied to each field generating electrode is defined as $V'_1, V'_2, V'_3 \ldots V'_N$.

As shown in FIGS. 14 and 15, a voltage distribution corresponding to the interval between two lines of each of the focus profile is obtained and then, the interval between the focus profiles are periodically fluctuated by using the voltage distribution as shown in FIG. 16. The genetic feedback tuning loop technique is employed for the nonlinear optimal tuning of the input voltage profile (as described in the publication J. Hahn, H. Kim, K. Choi, and B. Lee, "Real-time digital holographic beam-shaping system with a genetic feedback tuning loop," Appl. Opt. 45, 915-924 (2006)). When the focus profile is formed by one line, only shifting the voltage applied to each field generating electrode is sufficient to achieve the desired oscillations, but when the focus profile is formed by two lines (or more), it is insufficient to simply shift the voltage and thus, a separate voltage is needed. The reason is that the interval between two lines of the focus profile is changed as shown in FIG. 16.

The photograph at the uppermost right of FIG. 16 shows the case which is similar the case in which the focus profile is formed by one line, but the focus profile at the uppermost right of FIG. 16 is actually spaced at a slight distance like the left graph of FIG. 16. (However, the focus profile may, in other exemplary embodiments, be periodically repeated in a manner that it may start from a single line and be divided into two or more lines and then, be returned to one line.)

In this case shown in FIG. 16, the frequency at which the lines of the focus profile are oscillated left and right may be 60 Hz or more.

As shown in FIG. 16, when the focus profile of the liquid crystal lens unit is oscillated to both sides, the moiré pattern that generated while the black matrix is seen may be removed. That is, when the focus profile stays at a fixed position, there is a position in which the black matrix is viewable, such that the 3D display characteristics are deteriorated at the corresponding position. However, when the position of the focus profile is oscillated as shown in FIG. 16, it is time integrated with the section in which the black matrix is not shown, even though the black matrix can be seen for an instant, such that the 3D stereoscopic image is displayed. As a result, the display quality is improved or the moiré pattern due to the black matrix does not occur.

Hereinafter, the relation between the display panel and the liquid crystal lens unit will be described with reference to FIGS. 9, 10, and 17.

Figure 17:
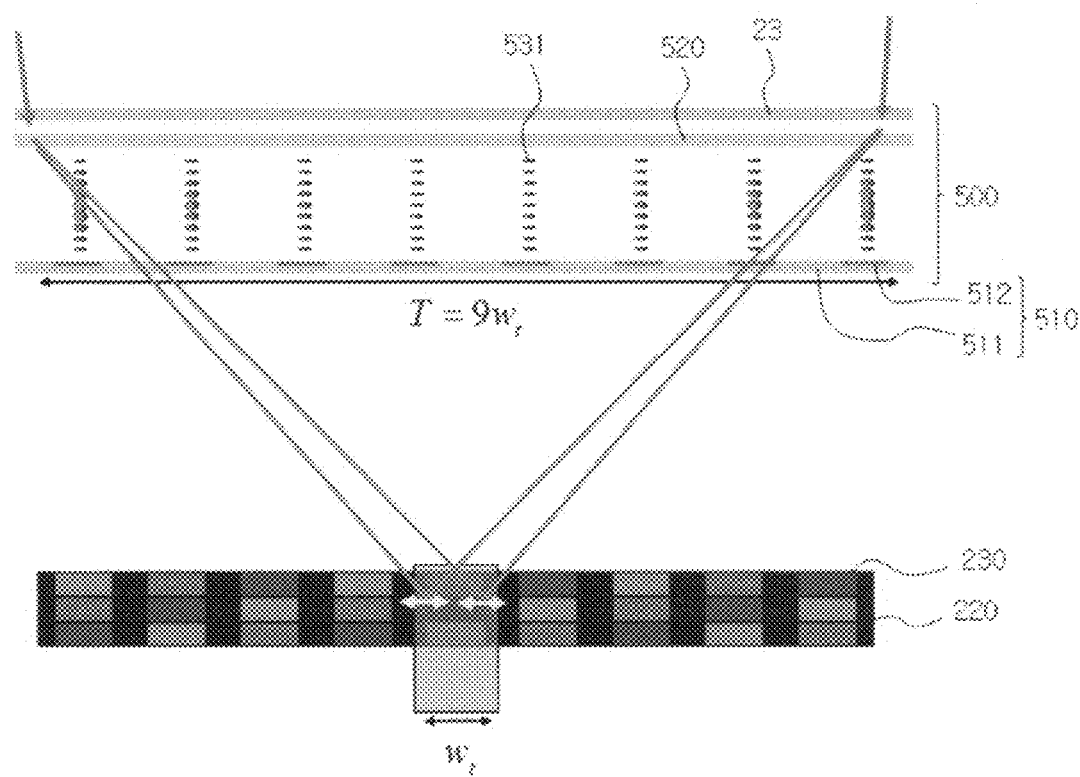
FIG. 17 is an enlarged cross-sectional view showing a liquid crystal lens unit and a black matrix and a color filter unit of a display panel in a 3D image display according to another exemplary embodiment.

FIG. 17 is an enlarged cross-sectional view of a portion of the black matrix and the color filter of the liquid crystal lens unit and the display panel in the 3D image display according to another exemplary embodiment, having the same orientations for the black matrix 220, color filter 230 and liquid crystal lens unit 500 as described above for FIG. 11.

Referring to FIG. 17, in combination with FIGS. 9 and 10, the liquid crystal lens unit corresponds to 9 subpixels so as to have a width of 9 Wt. The width of side to side oscillations of the focus profile of the liquid crystal lens unit needs to be controlled so as to display the images while corresponding to the width Wt of the subpixel array used in the display.

As described above, when the position of the focus profile is oscillated, the display quality is improved and the moiré pattern is removed.

In addition, when the oblique line is conventionally displayed on the display panel, the pixel has a quadrangular structure, such that the oblique line that is displayed is not smooth, but has, for example, a sawtooth shape. Generally, in order to solve the problem, a rendering processing is performed to apply data. When the focus profile is oscillated as described herein, the oblique line can be smoothly displayed without performing the separate rendering processing.

The present disclosure describes only the case in which the focus profile of the liquid crystal lens unit is displayed by one line or two lines, as shown in FIGS. 5 and 12. However, various focus profiles can be used, depending on the embodiment, by controlling the voltage applied to the liquid crystal lens unit and oscillating the focus profile at a predetermined period.

While exemplary embodiments have been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure, including the appended claims.

What is claimed is:

1. A 3D image display, comprising:
a display panel including a plurality of color pixels, and configured to display an image, wherein each of the plurality of color pixels includes a color filter surrounded by a black matrix; and
a liquid crystal lens unit positioned over the corresponding color pixels for displaying a 3D stereoscopic image of the image displayed on the display panel, the liquid crystal lens unit including a first substrate positioned over the display panel including the plurality of color pixels, a second substrate positioned over the first substrate on a side of the first substrate opposite the display panel including the plurality of color pixels, a liquid crystal layer positioned between the first and second substrates, and a plurality of field generating electrodes,
wherein voltage is applied to the plurality of field generating electrodes for producing a focus profile of light emitted from the corresponding pixels,
wherein voltage applied to the plurality of field generating electrodes is fluctuated at a frequency so that the focus profile is oscillated within the corresponding pixels, and the frequency of an oscillation of position of the focus profile between one side and another side of the corresponding pixels is 60 Hz or more,
wherein when the position of the oscillated focus profile is on the black matrix of the corresponding pixels, the black matrix is seen by a viewer, and
wherein when the position of the oscillated focus profile is on the color filter of the corresponding pixels, color of the color filter is seen by the viewer.

2. The 3D image display of claim 1, wherein:
a focus profile of light that passes through the liquid crystal lens unit is a single line.

3. The 3D image display of claim 2, wherein:
each of the field generating electrodes has a voltage level and a pattern of the voltage levels is symmetrical about a central one of the plurality of field generating electrodes.

4. The 3D image display of claim 2, wherein:
the voltage level applied to the each of the field generating electrodes periodically shifts to an adjacent one of the field generating electrodes.

5. The 3D image display of claim 1, wherein:
the width of one subpixel includes a width of the color filter and a width of at least a part of the black matrix.

6. The 3D image display of claim 1, wherein:
a focus profile of light that passes through the liquid crystal lens unit is two or more lines.

7. The 3D image display of claim 6, wherein:
each of the field generating electrodes has a voltage level and a pattern of the voltage levels is symmetrical about a central one of the plurality of field generating electrodes.

8. The 3D image display of claim 6, wherein:
an interval between two or more lines of the focus profile oscillates within a predetermined spatial range.

9. The 3D image display of claim 8, wherein:
the voltage level applied to the each of the field generating electrodes is set based on the interval between the two or more lines of the focus profile.

10. The 3D image display of claim 8, wherein:
the interval between the two or more lines of the focus profile corresponds to a width of one subpixel in the display panel to display an image.

11. The 3D image display of claim 10, wherein:
the width of one subpixel includes the width of the color filter and the width of at least a portion of the black matrix surrounding the color filter.

12. The 3D image display of claim 1, wherein:
the display panel includes an N-pixel array, and
a size and position of the liquid crystal lens unit corresponds to a size and position of the N pixel array.

13. The 3D image display of claim 12, wherein:
each pixel in the N pixel array includes three-color subpixels of red, green, and blue,
the subpixels in the N pixel array are arranged in the row direction in order of subpixels of red, green, and blue and are arranged in the column direction in order of subpixels of red, green.

14. The 3D image display of claim 1, wherein:
all of the one or more field generating electrodes are formed on the same layer.

15. The 3D image display of claim 1, wherein:
the one or more field generating electrodes are formed on two layers.

16. The 3D image display of claim 1, wherein:
the liquid crystal lens unit further includes a polarizer on an outer side thereof.

* * * * *